(12) United States Patent
Launder

(10) Patent No.: US 10,349,650 B1
(45) Date of Patent: Jul. 16, 2019

(54) BIRD CONTROL SYSTEM

(71) Applicant: James Harry Launder, Findlay, OH (US)

(72) Inventor: James Harry Launder, Findlay, OH (US)

( * ) Notice: Subject to any disclaimer, the term of this patent is extended or adjusted under 35 U.S.C. 154(b) by 371 days.

(21) Appl. No.: 15/232,867

(22) Filed: Aug. 10, 2016

Related U.S. Application Data

(60) Provisional application No. 62/203,490, filed on Aug. 11, 2015.

(51) Int. Cl.
  *A01K 37/00* (2006.01)
  *A01M 29/32* (2011.01)
  *A01M 29/16* (2011.01)

(52) U.S. Cl.
  CPC ............ *A01M 29/32* (2013.01); *A01M 29/16* (2013.01)

(58) Field of Classification Search
  CPC ...... A01M 29/32; A01M 29/06; A01M 29/30; E04B 1/72
  USPC .................. 119/713, 903, 52.3, 57.9; 52/101
  See application file for complete search history.

(56) References Cited

U.S. PATENT DOCUMENTS

| | | | | |
|---|---|---|---|---|
| 4,937,988 A * | 7/1990 | Gratton | .................. | A01K 39/01 256/11 |
| 5,092,088 A * | 3/1992 | Way | .......................... | E04B 1/92 52/101 |
| 5,836,114 A * | 11/1998 | Ohba | ..................... | A01M 29/26 52/101 |
| 6,003,471 A * | 12/1999 | Ohba | ..................... | A01M 29/26 119/713 |
| 6,477,977 B1 * | 11/2002 | Combes | ................. | A01M 29/32 114/343 |
| 8,107,235 B2 * | 1/2012 | Yeh | ....................... | H04M 1/0237 361/679.28 |
| 2005/0217187 A1 * | 10/2005 | Pace | ...................... | A01M 29/32 52/101 |
| 2007/0074467 A1 * | 4/2007 | Zecher | ................... | A01M 29/32 52/101 |
| 2015/0335006 A1 * | 11/2015 | Lee | ........................ | A01M 29/22 119/713 |

* cited by examiner

*Primary Examiner* — Trinh T Nguyen
(74) *Attorney, Agent, or Firm* — Jerry Semer

(57) ABSTRACT

The invention in whole is designed to simply and effectively control problems associated with birds in the area. More specifically it suspends a taut line just above a surface, thereby, preventing birds from landing on or near the line. The design has been refined to be as minimalistic as possible while still providing a high quality product that will last for years. Inherently, this also produces both an aesthetically pleasing and non intrusive product. Since Birds cannot grasp the thin line, they are forced to seek distant landing points. The thin line by nature will vibrate in even the slightest wind. This produces both audible and inaudible sounds further repelling birds from the protected area. Birds quickly loose the lure to be in the protected area, greatly reducing associated bird problems. The simple deployment of this system produces both instant and obvious results.

5 Claims, 6 Drawing Sheets

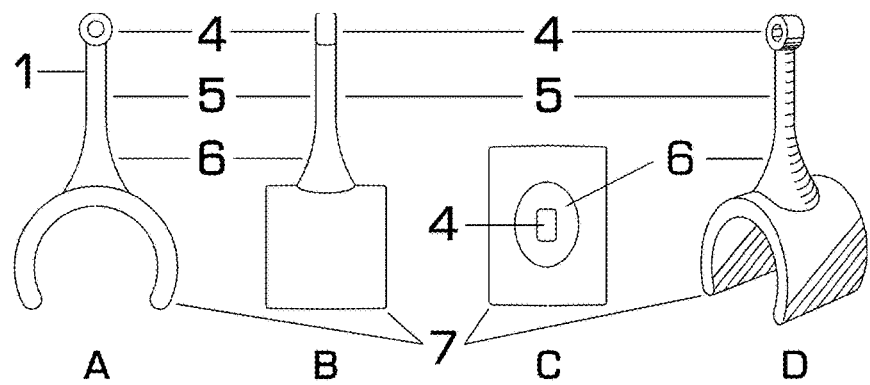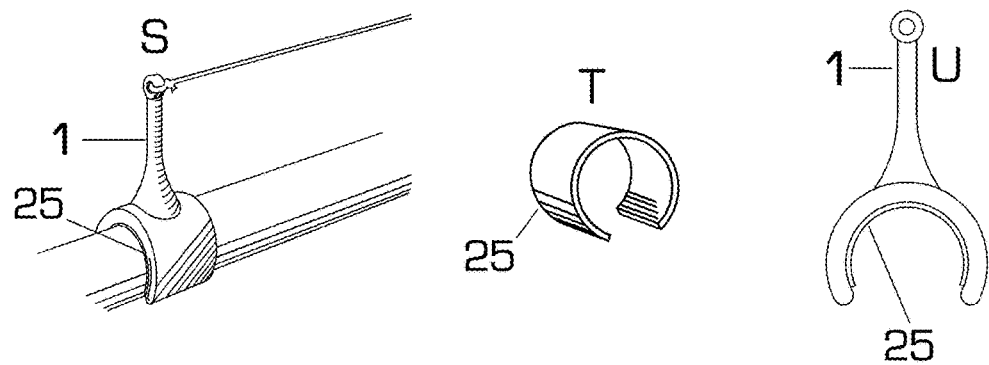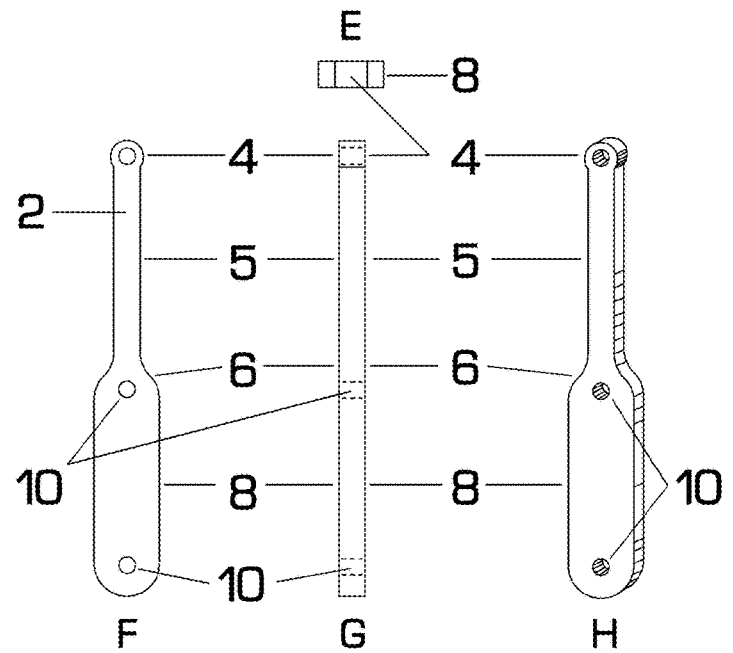

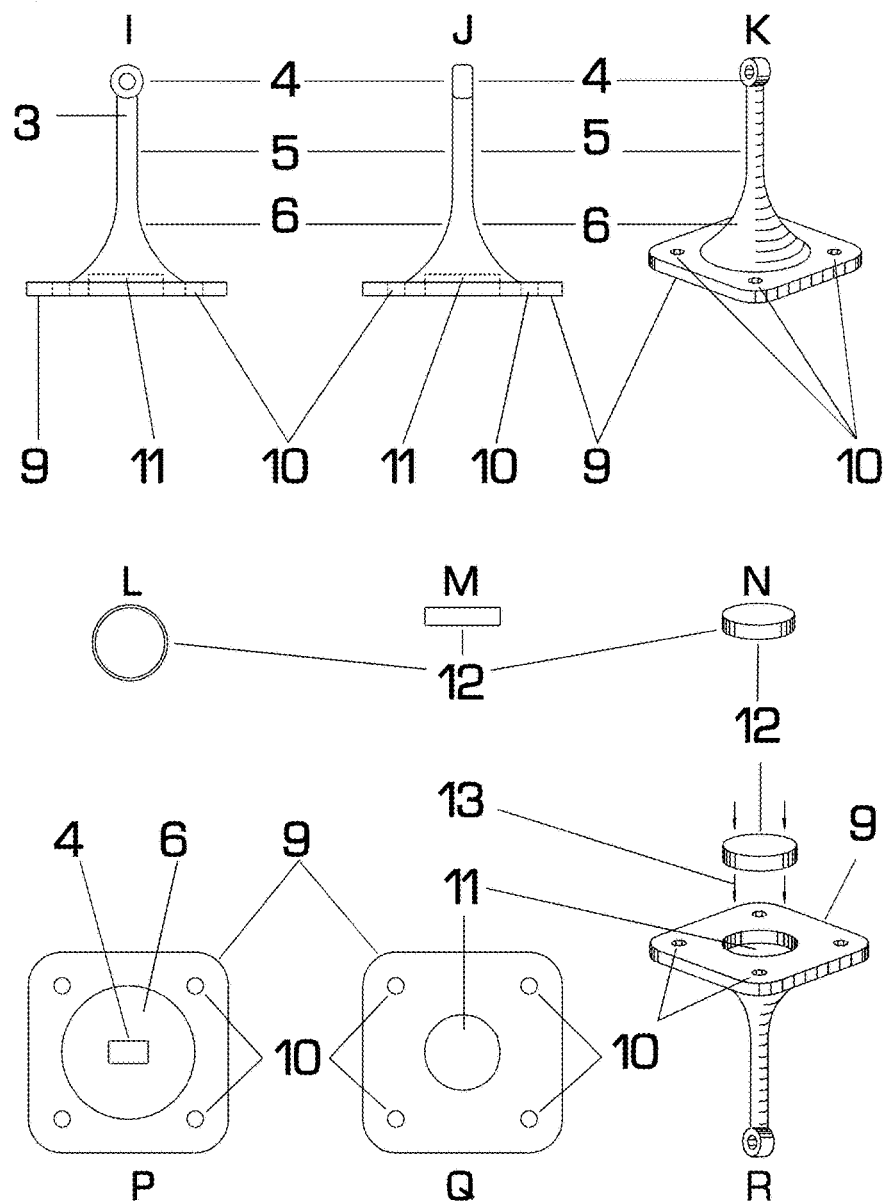

15  3(ALL)  14

12A  3  15
12  14

15
3
16
17

3
15
17

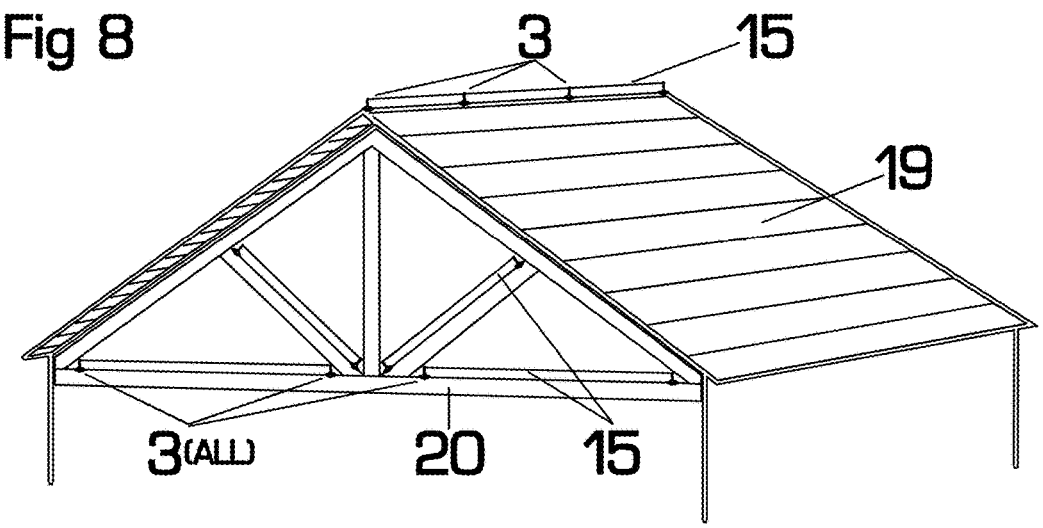
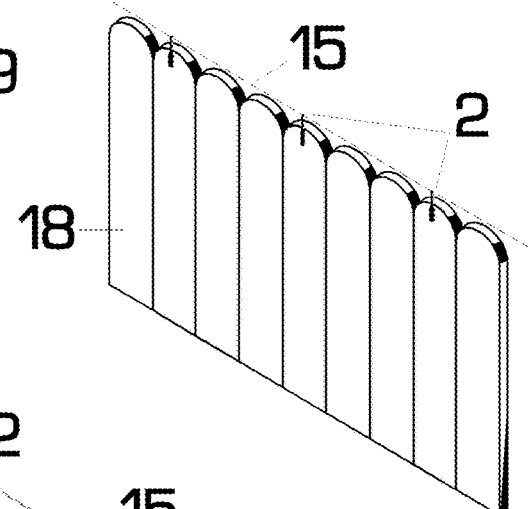
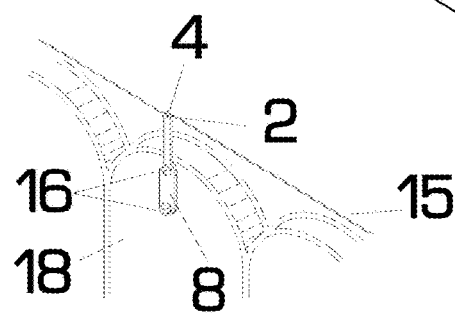

BIRD CONTROL SYSTEM

FIELD OF INVENTION

The invention relates to the field of a system for controlling birds and more particularly for a physical system that eliminates a bird's capability of landing in a protected area.

BACKGROUND OF THE INVENTION

Birds are nice to look at from a distance, but up close they are a real problem. Birds are noisy and their droppings are a real health hazard. For boaters, birds are an ongoing problem. Birds constantly perch on boat railings chirping and leaving their droppings behind. Home owners have similar issues with birds leaving droppings on their fences, rooftops and in barns. To solve the problem, people have tried many solutions. These solutions usually fall into one of three categories. (A) loud noises, such as, those made by large speakers. This system is effective, but noisy. (B) Bright lights, reflectors, spinners or flashers. This system is only partially effective. It is also annoying to humans and unsightly. (C) Installing figurines of a bird's natural enemy. Examples of this would be a scarecrow or bird of prey. This method is almost always unsuccessful and the figurines often end up as a perch itself.

The inventor has developed an ingenious solution to the bird problem. The Bird Control System is designed to provide an aesthetically pleasing, easy to use and humane way of controlling birds in the protected area. This greatly reduces the noise and mess associated with the bird's presence. By deploying the system, one can effectively create an area in which birds cannot land and then ultimately avoid it all together. If needed, the system is easy to deploy or retract quickly.

Features that make this system both efficient and effective are a thin flexible line and its non intrusive base to which the line is secured. The line is held taut a small distance above a surface by a set of risers. The birds cannot grasp the line; therefore, they are incapable of landing on or near it. Thus the line forces the birds to seek distant roosting points.

The inventor has noticed that once a system has been deployed for a few days, the birds seem to avoid a much larger area surrounding the system. Even in the slightest breeze, the line begins to vibrate emitting both audible and inaudible sounds. The audible tone is barely noticeable to humans, but is obviously unpopular with birds. Evidently, by removing close roosting points and emitting noise, a broader area of protection is provided.

The invention is surely sought by anyone who is annoyed by the birds noise or mess associated with them. They are then further angered when they attempt to shoo them away only to find that they have left something behind for them to clean up. This system is a cost effective, non intrusive and aesthetically pleasing solution to a very common problem.

SUMMARY OF THE INVENTION

The invention is a physical system designed to suspend a thin taut line approximately 1" above a surface. Birds cannot grasp the thin line thereby eliminating it's capability of landing on or near it. The invention has two main items. First is the line. The line is both thin and flexible. The second item is the riser. The riser has an eyelet on the top to secure the line to and a base at the bottom to secure the riser to the desired surface.

There are four basic types of bases, each with its own specific use. All of which include the column and eyelet. The Clamp Mount with the Clamp Mount Size Reducer will fit Tubular railings up to 1.25" in diameter. The Universal Mount will fit all tubular railing from 1.5" up and also all square and rectangular railings. There are also bases that mount both horizontally and vertically.

Out of the top of the base, a column or riser protrudes. At the top of the riser is an eyelet. The eyelet is designed such that the line can pass through it and/or be secured to it. The risers are laid out on a surface or railing some distance apart and are securely attached to that surface or railing. The line is then secured to the first or end eyelet. The line is then ran and secured to the next closest eyelet. The line can be secured to the eyelet in any number of ways. These include, but are not limited to; tying, running straight through or by looping through and back over the eyelet, ultimately securing it in place. One then proceeds to the next closest eyelet continuing along the protected path until the last eyelet is reached. The line is then tied to the last riser's eyelet. The line must remain taut between all eyelets.

BRIEF DESCRIPTION OF FIGURES

FIG. 1: Multi views of Clamp Mount and Clamp Mount Size Reducer
FIG. 2: Multi views of Vertical Mount
FIG. 3: Multi views of Horizontal Mount
FIG. 8: Horizontal Mount on Roof Top and inside building
FIG. 9: Vertical Mount of Privacy Fence
FIG. 10: Close up of Vertical Mount on Privacy Fence

Figure 4:
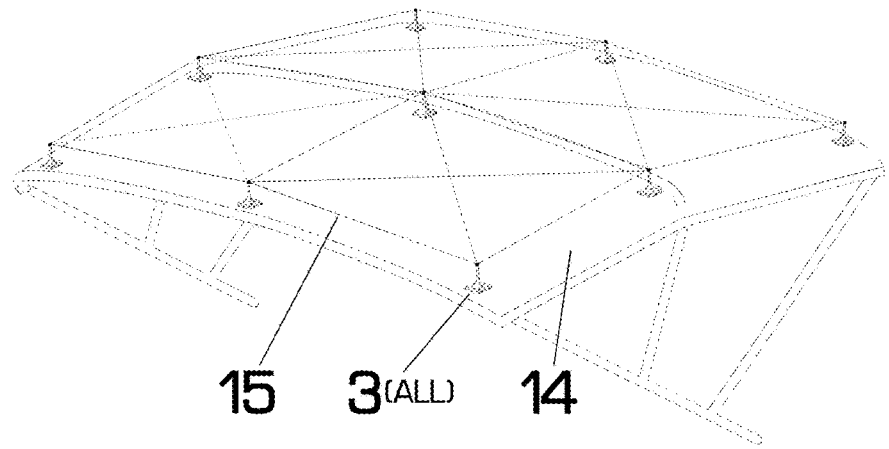
FIG. 4: Horizontal Mount on Bimini Top

ALPHABETICAL VIEW DESCRIPTIONS (A) Clamp Mount: front view
(B) Clamp Mount: side view
(C) Clamp Mount: top view
(D) Clamp Mount: perspective view
(E) Vertical Mount: top view
(F) Vertical Mount: front view
(G) Vertical Mount: side view
(H) Vertical Mount: perspective view
(I) Horizontal Mount: front view
(J) Horizontal Mount: side view
(K) Horizontal Mount: perspective view
(L) Magnet: top view
(M) Magnet: side view
(N) Magnet: perspective view
(O) Omitted for clarity
(P) Horizontal Mount: top view
(Q) Horizontal Mount: bottom view
(R) Horizontal Mount: bottom perspective showing magnet cavity
(S) Clamp Mount Riser with Clamp Mount Size Reducer in place
(T) Clamp Mount Size Reducer: prospective view
(U) Clamp Mount with Railing Size Reducer in place
(V) Universal Mount: front View
(W) Universal Mount: side view (X) Universal Mount: top view
(Y) Universal Mount, mounted to rail using Nylon Tie Straps
(Z) Nylon Tie Strap (preexisting but used as attachment device)

NUMERICAL COMPONENT DESCRIPTION

1: Clamp Mount: full embodiment
2: Vertical Mount: full embodiment
3: Horizontal Mount: full embodiment
4: Eyelet: common to all
5: Riser: common to all
6: Transition: common to all
7: Clamp Base: of clamp mount
8: Vertical Base: of vertical mount
9: Horizontal Base: of horizontal mount
10) Attachment holes in Base: to run screws or nails through
11) Magnet Cavity: horizontal base only to accept magnet
12) Magnet
12A) Fixed Magnet: magnet 12 becomes 12A once it is fixed into horizontal mount 3
13) Action showing insertion of magnet into cavity in base
14) Bimini Top or Tarp
15) Line: common to all
15A) Line tied to Eyelet
15B) Line looped through and back over Eyelet
15C) Line running straight through Eyelet
16) Screws or Nails: to attach base to surface
17) Post Type Fence
18) Privacy Type Fence
19) Building Roof
20) Building inner structure: rafter, trusses, beams
21) Boat Railing: tubular type
22) Boat
23) Universal Mount: full embodiment
24) Universal Base: of Universal Mount
25) Clamp Mount Size Reducer: full embodiment
26) Nylon Tie Strap: (zip tie)

DETAILED DESCRIPTION OF PREFERRED EMBODIMENT

The system incorporates four basic sub components into one functioning unit. First is Line 15. Line 15 can be secured to each Eyelet 4 in any number of ways. One way is by tying Line 15 directly to Eyelet 4 as shown by 15A. 15B shows Line 15 looped through and back over Eyelet 4. 15C shows Line 15 running straight through Eyelet 4. Any method that securely attaches Line 15 to its respective Eyelet 4 is acceptable as long as each line segment remains taut between all Eyelets 4.

Second is the Eyelet 4 to which the aforementioned Line 15 is attached.

Third is the Riser 5. The Riser 5 effectively raises the Eyelet 4 approximately 1" above the surface being protected. It further attaches Eyelet 4 to its respective Base 7, 8, 9 or 24.

Forth is the Base 7, 8, 9 or 24 of which there are four types (A) Clamp Base 7, (B) Vertical Base 8, (C) Horizontal Base 9, (D) Universal base 24.

The Clamp Base 7 in its Full Embodiment 1 is designed to securely snap or clamp around a tubular Boat Railing 21 using its Clamp Base 7. The Clamp Base 7 is a piece of material shaped in a C. Typical Boat Railings 21, vary in diameter. This Clamp Base 7 along with the Clamp Mount Size Reducer 25 allow the Clamp base to be mounted to all Boat Railings 21 up to 1.25" in diameter. The Clamp Mount Size Reducer 25 is a piece of flexible material. By positioning a series of Clamp Mounts 1 on the Boat Railing 21 roughly 4' apart from one another; and then securing Line 15 from one end Eyelet 4, to each consecutive Eyelet 4 and finally to the last Eyelet 4. A protective barrier is created protecting the Boat Railing 21 and the Boat 22 itself.

The Vertical Base 8 in its Full Embodiment 2 is designed to be attached to a vertical surface utilizing the integral Attachment Holes 10. To attach Vertical Base 8 to a vertical surface, one needs to either Screw or Nail 16 the Vertical Base 8 to the surface by running the Screws or Nails 16 through the Attachment Holes 10 and directly into the surface it is being mounted to. By positioning a series of Vertical Mounts 2 roughly 4'-8' apart from one another and then securing the Line 15 to each respective Eyelet 4 a protective barrier is produced effectively protecting the desired surface.

Figure 5:
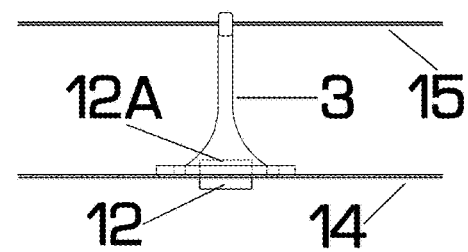
FIG. 5: Horizontal Mount magnetically mounted

The Horizontal Base 9 in its Full Embodiment 3 is designed to be attached to a horizontal surface and is the most diverse. Many mounting options include gluing, double side tape or utilizing the integral Attachment Holes 10 or the integrated Fixed Magnet 12A. To attach the Horizontal Base 9 to a horizontal surface, one needs to either Screw or Nail 16 the Horizontal Base 9 to the surface by running Screws or Nails 16 through its integrated Attachment Holes 10 and directly into the surface to which it is being attached. By positioning a series of Horizontal Mounts 3 roughly 4'-8' apart from one another and then securing the Line 15 to each respective Eyelet 4, a protective barrier is produced effectively protecting the desired surface. Horizontal Base 3 also incorporates a Fixed Magnet 12A (12 becomes 12A once it is fixed into base). The Magnet 12 is permanently secured into the Magnet Cavity 11 and is flush with its bottom. It is now considered one with the Horizontal Mount 9. When using the Magnet option, one can directly attach the Horizontal Mount 3 to any magnetic surface. Another option is by utilizing a Magnet 12. By sandwiching the cloth of a Bimini Top or Tarp 14 between the Fixed Magnet 12A and the Magnet 12 as shown in FIG. 5, the position of the Horizontal Base 3 is thereby secured. By positioning a series of Horizontal Mounts 3, roughly 3' apart from one another in a grid pattern (see FIG. 4) and then securing the line 15 in both a square and cross pattern to the respective Eyelets 4, a large protective area can be produced.

DETAILED DESCRIPTION OF EACH FIGURE

FIG. 1: Shows the full embodiment of the Clamp Mount 1 along with its multi views A, B, C, D, S, T, U. and the respective sub segments numerically indicated. It also shows multi views of the associated Clamp Mount Size Reducer 25 and its intended use.
FIG. 2: Shows the full embodiment of Vertical Mount 2 along with its multi views E-H and the respective sub segments numerically indicated.
FIG. 3: Shows the full embodiment of the Horizontal Mount 3 and Magnet 12 along with multi views of each I-R (omitting O for clarity) and the respective sub segments numerically indicated.
FIG. 4: Shows the system deployed on a Bimini Top 14. Each Horizontal Mount 3 is secured to the Bimini Top 14 using the Fixed Magnet 12A within The Horizontal Base 9 and another Magnet 12 (not shown) positioned directly under the Horizontal Mount 3. The attraction between both magnets securely holds the Horizontal Mount 3 in it desired position. It also shows Line 15 secured to each Eyelet 4 in both a square and cross pattern.

FIG. 5: Shows a close up view of the Horizontal Mount 3 fixed to a Bimini Top or Tarp 14. It also shows Line 15 running straight through Eyelet 4. The attraction between Magnets 12A and Magnet 12 beneath the Bimini or Tarp 14 securely holds Horizontal Mount 3 in place.

Figure 6:
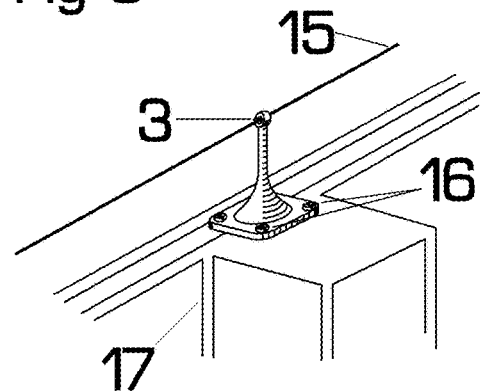
FIG. 6: Close up view of Horizontal Mount on Post Fence

FIG. 6: Shows a close up view of the Horizontal Mount 3 fixed to a Post Type Fence 17 using Screws or Nails 16. It also shows Line 15 running along the fence top and looped through Eyelet 4.

Figure 7:
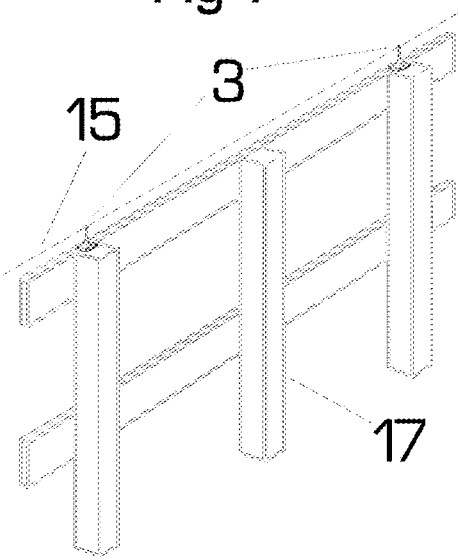
FIG. 7: Horizontal Mount on Post Fence

FIG. 7: Shows the Horizontal Mount 3 Fixed to a Post Type Fence 17 and Line 15 attached to each Eyelet 3.

FIG. 8: Shows a building, on the peak of Building Roof 19, Horizontal Mounts 3 are securely places 4'-8' apart. Line 15 is then secured to each Eyelet 4 along the roof peak. It also shows Horizontal Mounts 3 deployed within the buildings inner structure using Screws or Nails 16 to attach them to the structure. Line 15 is also appropriately shown.

FIG. 9: Shows the Vertical Mount 2 secured to a Privacy Type Fence 18 using Screws or Nails 16. It also shows Line 15 running parallel with the fence top.

FIG. 10: Shows a close up view of Vertical Mount 2 secured to a Privacy Type Fence 18 using Screws or Nails 16 running through its Base 8. Line 15 can be seen running parallel with the fence top and directly through Eyelet 4.

Figure 11:
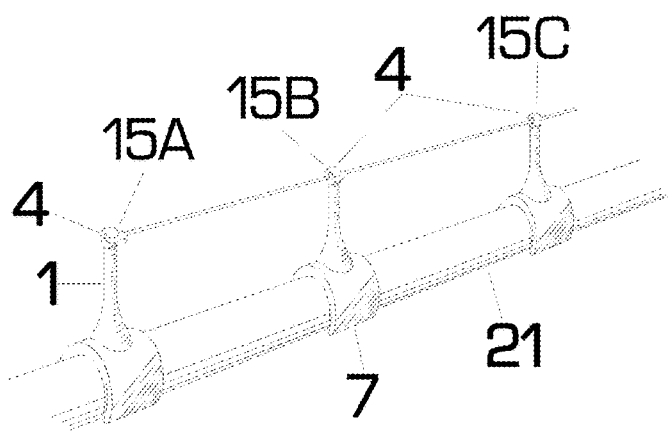
FIG. 11: Close up of Clamp Mount on Boat Railing

FIG. 11: Shows a close up view of Clamp Mount 1 attached to a Boat Railing 21. The Clamp Base 7 securely holds each Clamp Mount in place. Also shown is the respective Eyelets 4. Line 15 is shown secured to each Eyelet 4 in three different ways. 15A shows the Line 15 tied directly to the Eyelet 4. 15B shows Line 15 looped through and back over Eyelet 4. 15C shows Line 15 running straight through Eyelet 4.

Figure 12:
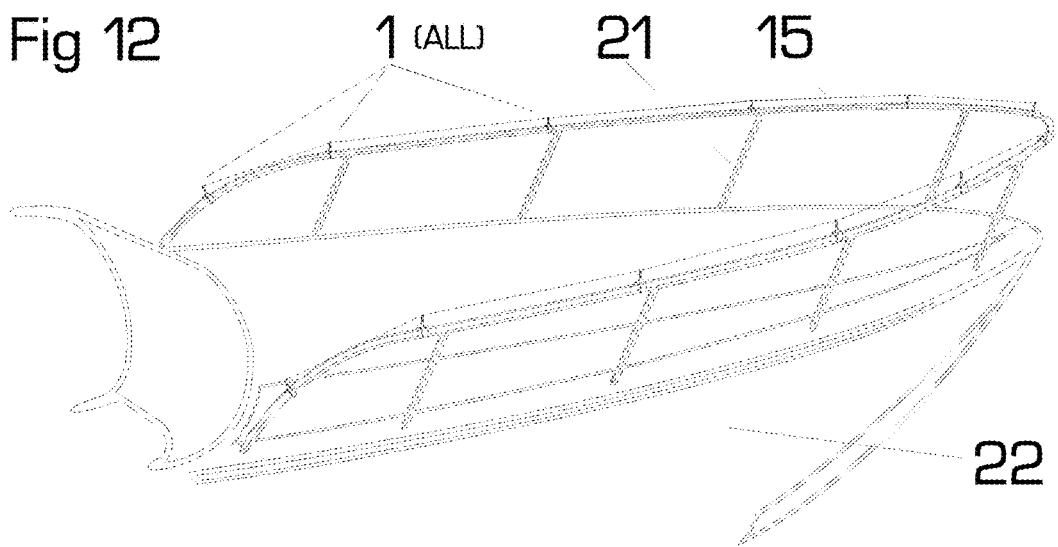
FIG. 12: Clamp Mount on Boat Railing

FIG. 12: Shows the system deployed on the front Boat Railing 21 using Clamp Mounts 1 to suspend Line 15 above Boat Railing 21.

Figure 13:
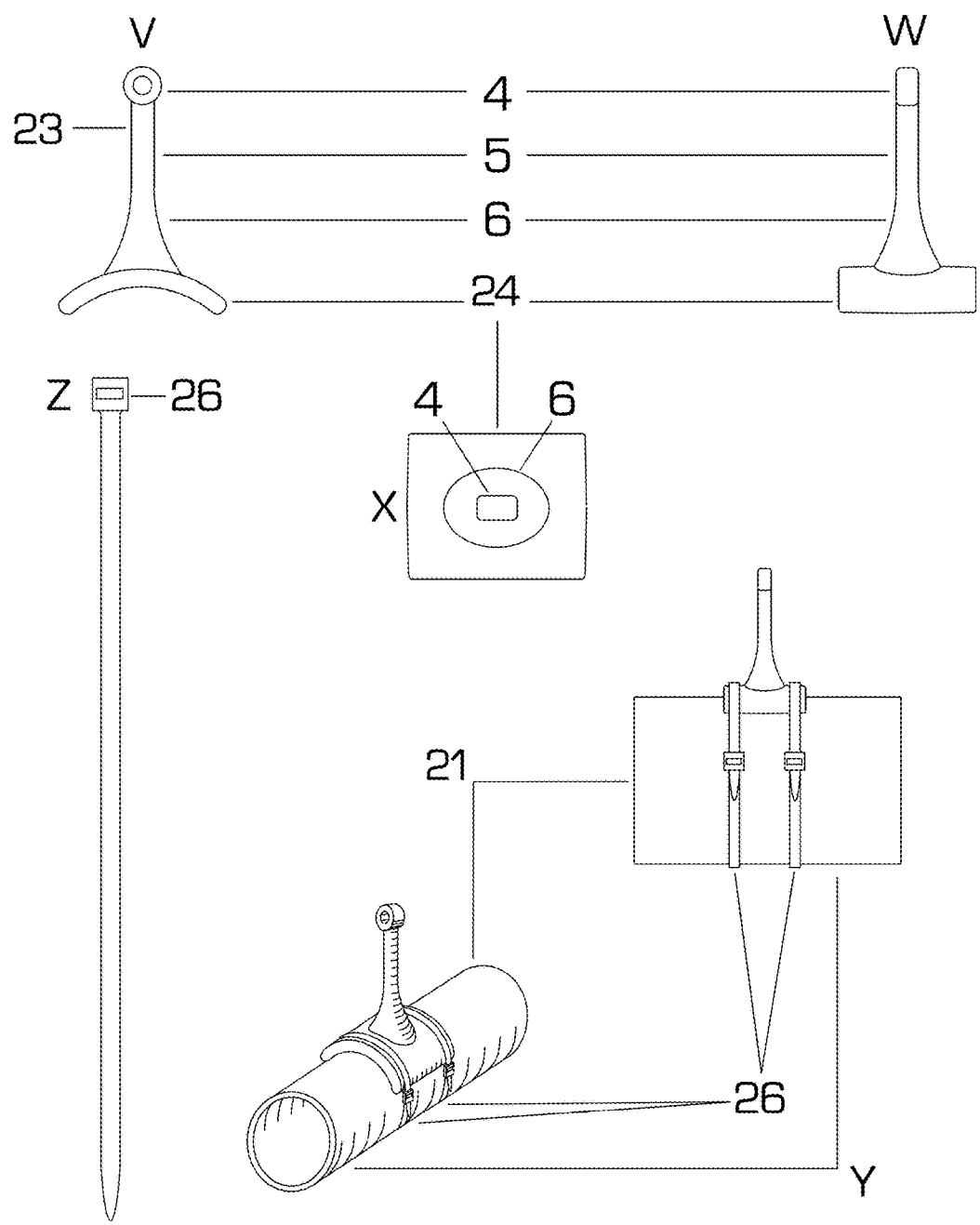
FIG. 13: Multi views of Universal Mount

FIG. 13: Shows full embodiment of Universal Mount along with multi views thereof. Including a front view V, side view W and top view X. Also portrayed are views Y, Both of which show the intended mounting manner in which Universal Mount is attached to boat railing 21 using tie strap 26.

I claim:

1. A bird control system comprising:
   a. risers with a top and bottom; and,
   b. eyelets at the top of the risers; and,
   c. a line of sufficient length that it can be stretched tautly between the risers; and,
   d. an area from which birds are to be kept from landing containing a railing: and,
   e. a means to attach the risers to a railing comprises:
      1. a piece of material shaped in a C with an inner circumference; and,
      2. on the side opposite the opening of the C, the piece of material attaches to the bottom of the risers; and,
      3. the material is flexible enough to snap over a railing and the piece of material is shaped such that it will snugly and securely hold the risers in place when the line is secured to the risers and the line is taut.

2. A bird control system as in claim 1 further comprising:
   a. a flexible piece;
   b. said flexible piece is fit against the inner circumference of the piece of material shaped in a C to create a more snug and more secure fit to hold the riser in place when the line is secured to the risers and the line is taut.

3. A bird control system as in claim 1 wherein:
   a. the line is secured tautly from one eyelet to the next by tying the line to the eyelets.

4. A bird control system as in claim 1 wherein:
   a. there is a first eyelet and a last eyelet
   b. the line is secured tautly from one eyelet to the next by tying the line to the first eyelet; and,
   c. running the line tautly through other eyelets; and,
   d. running the line tautly to the last eyelet and tying the line to the last eyelet.

5. A bird control system as in claim 1 wherein:
   a. there is a first eyelet and a last eyelet
   b. the line is secured tautly from one eyelet to the next by tying the line to the first eyelet; and,
   c. running the line tautly to another eyelet and looping the line through and back over eyelet; and,
   d. running the line tautly to the last eyelet and tying the line to the last eyelet.

* * * * *